Patented Jan. 17, 1939

2,144,219

UNITED STATES PATENT OFFICE

2,144,219

AZO DYES AND METHODS FOR THEIR PREPARATION

Robert E. Etzelmiller, Wilmington, Del., assignor to E. I. du Pont de Nemours & Company, Wilmington, Del., a corporation of Delaware No Drawing. Application August 15, 1933, Serial No. 685,231

18 Claims. (Cl. 260—152)

This invention relates to the preparation of azo colors and more particularly refers to the production of water-insoluble dyes and pigments having the following general formula:

in which Z represents the residue of a heterocyclic compound, arylene represents the residue of an aromatic amine and A represents the residue of an ice color coupling component.

It is an object of this invention to produce new water-insoluble dyes and pigments. A further object is to produce ice colors which impart to textile materials attractive shades having good fastness to light, washing, kier-boiling and chlorine. A still further object is to produce compounds possessing numerous and desirable shades, such shades as yellow, scarlet, red, Bordeaux, violet, blue, green, brown, and black, being capable of production according to the following instructions. Additional objects will become apparent from a consideration of the following description.

These objects are attained according to the herein described invention which in its preferred embodiment comprises coupling a diazotized aromatic amine having the following general formula:

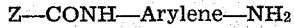

in which Z represents the residue of a heterocyclic compound of the furane or thiophene series and arylene represents the residue of an aromatic amine of the benzene or naphthalene series, with an ice color coupling component, preferably with an arylamide of 2-3-hydroxy-naphthoic acid. Amino bases of this general formula are more particularly described and claimed in my copending application, Serial No. 685,640, filed August 17, 1933.

The invention may be more readily understood by a consideration of the following illustrative examples, in which the quantities are stated in parts by weight:

EXAMPLE 1

Cotton skeins, impregnated in the usual manner with the beta-naphthalide of 2,3-hydroxy-naphthoic acid were developed in a diazo bath prepared as follows:

20.2 parts of furoyl-p-phenylene-diamine were stirred with 30 parts of hydrochloric acid of 30% strength and 350 parts of cold water, and the base diazotized with 7 parts of sodium nitrite dissolved in 30 parts of water. When the diazotization was complete, the solution was filtered and the mineral acidity neutralized with sodium acetate.

When the development of the color in the above bath was complete, the skeins were rinsed, soaped at the boil, rinsed and dried. By this process a bright red-Bordeaux dye of the probable structure:

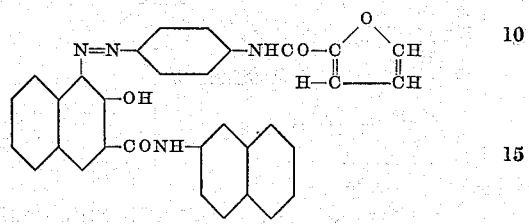

was obtained. The color possessed good fastness to washing and light.

EXAMPLE 2

Cotton skeins, padded with a solution of beta-naphthol in caustic, were developed in a diazo solution prepared as in Example 1. When the development was complete, the skeins were rinsed, soaped at the boil, rinsed and dried. An orange dyeing of fair fastness to washing was obtained. The dye has the probable formula:

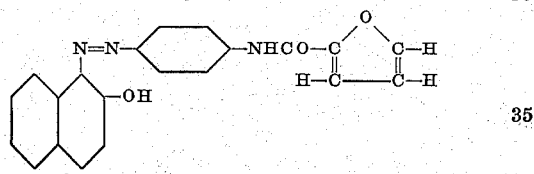

EXAMPLE 3

Cotton skeins, impregnated in the usual manner with the beta-naphthalide of 2,3-hydroxy-naphthoic acid, were developed in a diazo bath prepared as follows:

21.6 parts of 2-furoylamino-5-amino-toluene were stirred with 30 parts of hydrochloric acid of 30% strength and 350 parts of cold water, and the base diazotized with 7 parts of sodium nitrite dissolved in 30 parts of water. When the diazotization was complete, the solution was filtered and the mineral acidity neutralized with sodium acetate.

When the development of the color in the above bath was complete the skeins were rinsed, soaped at the boil, rinsed and dried. By this process a red dye of good fastness to washing and fair fastness to light was obtained. The dye has the probable formula:

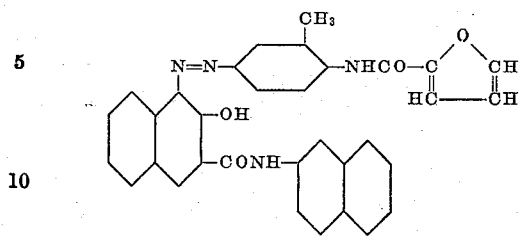

Example 4

Cotton skeins, padded in the usual manner with the p-chlor-anilide of 2-hydroxy-carbazole-3-carboxylic acid, were developed in the diazo bath prepared as in Example 3.

After the development, and the rinsing and soaping of the skeins, a brown dyeing of good fastness to light and washing was obtained. The dye has the probable formula:

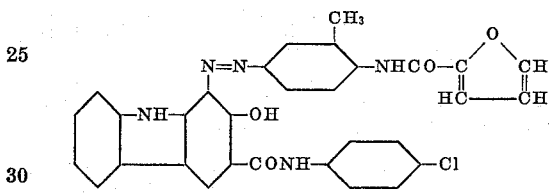

Example 5

Cotton skeins, padded in the usual manner with the beta-naphthalide of 2,3-hydroxy-naphthoic acid, were developed in a diazo bath prepared as follows:

23.2 parts of 2-furoylamine-5-amino-anisole were stirred with 30 parts of hydrochloric acid of 30% strength and 350 parts of cold water, and the base diazotized with 7 parts of sodium nitrite dissolved in 30 parts of water. The diazo solution was filtered and the mineral acidity neutralized with sodium acetate or sodium carbonate.

After the development in the above bath, and the rinsing and soaping of the skeins, a violet dyeing of good fastness to washing and fair fastness to light was obtained. The dye probably possesses the following formula:

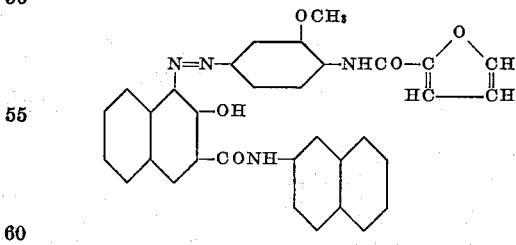

Example 6

Cotton skeins, padded in the usual manner with the ortho-toluidide of 2,3-hydroxy-naphthoic acid, were developed in a diazo bath prepared as follows:

29.0 parts of 4-furoylamino-2,5-diethoxy-aniline were stirred in 30 parts of hydrochloric acid of 30% strength and 350 parts of cold water, and the base diazotized with 7 parts of sodium nitrite dissolved in 30 parts of water. The diazo solution was filtered and the mineral acidity neutralized with sodium carbonate.

After the development, and the rinsing and soaping of the skeins, a bright blue dyeing of good fastness to light and washing was obtained. The dye has the probable formula:

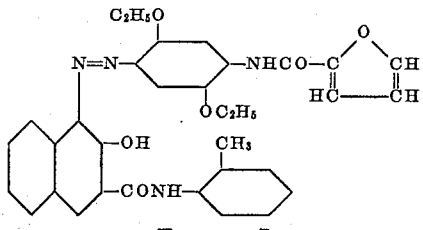

Example 7

Cotton skeins, padded in the usual manner with the ortho-toluidide of 2-hydroxy-anthracene-3-carboxylic acid, were developed in a diazo bath prepared as in Example 6.

After the development, rinsing and soaping, a greenish-blue dyeing of fair fastness to light and good fastness to washing was obtained. The dye has the probable formula:

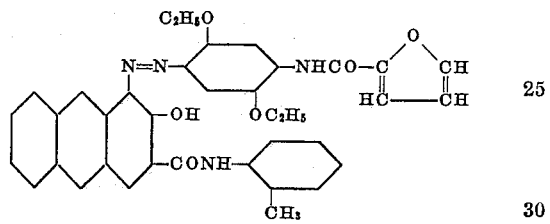

Example 8

Cotton skeins, impregnated in the usual manner with the beta-naphthalide of 2,3-hydroxy-naphthoic acid, were developed in a diazo bath prepared from 20.2 parts of furoyl-m-phenylenediamine by the method given in Example 1. After the development, and the rinsing and soaping of the skeins, a scarlet dyeing of good fastness to washing and fair fastness to light was obtained. The dye has the probable structure:

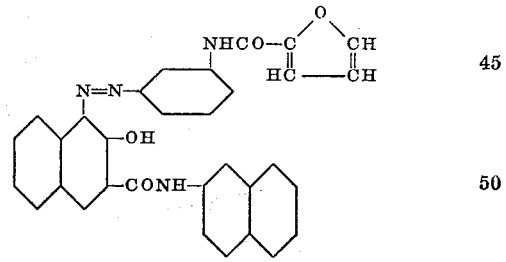

Example 9

Cotton skeins, impregnated in the usual manner with the ortho-anisidide of 2,3-hydroxy-naphthoic acid, were developed in a diazo bath prepared from 23.65 parts of 3-furoylamino-4-chloro-aniline by the method given in Example 1. After the development, and the rinsing and soaping of the skeins, a scarlet dyeing of good fastness to washing and fair fastness to light was obtained. The dye has the following structure:

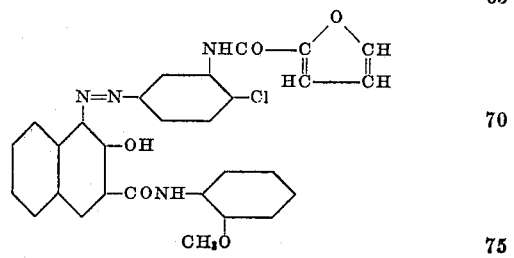

Example 10

Cotton skeins, padded in the usual manner with di-aceto-acetyl-o-tolidine, were developed in a diazo bath prepared from 21.6 parts of 4-furoylamino-2-amino-toluene by the method given in Example 1. After the development, and the rinsing and soaping of the skeins, a bright yellow dyeing of good fastness to washing and fair fastness to light was obtained. The dye probably has the following formula:

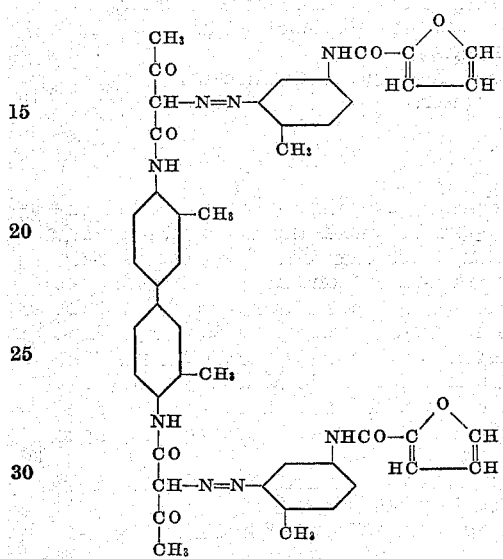

Example 11

Cotton skeins, padded in the usual manner with the ortho-toluidide of 2,3-hydroxy-naphthoic acid, were developed in a diazo bath prepared from 23.2 parts of 2-furoylamino-4-amino-anisole by the method given in Example 1. After the development, and the rinsing and soaping of the skeins, a red dyeing of good fastness to washing and fair fastness to light was obtained. The dye has the following structure:

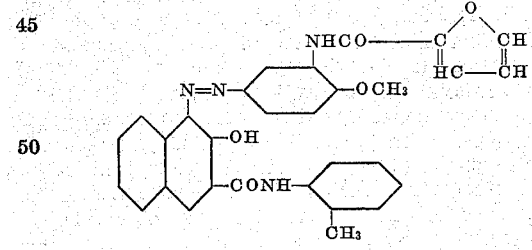

Example 12

*Preparation of chlorofuroylamino-2,5-dimethoxy-aniline*

112 parts of furoic acid were refluxed gently for 3-4 hours with an excess of sulfuryl chloride. The chlorinated furoyl chloride was separated from the excess of sulfuryl chloride by distillation. Distillation range 196-220° C.

A mixture of—

| | Parts |
|---|---|
| 4-nitro-2,5-dimethoxy-aniline | 10 |
| Benzene | 200 |
| Potassium carbonate | 18 |
| Chloro-furoyl chloride | 20 | was refluxed with stirring for 3-4 hours. The benzene was removed by steam distillation and the condensation product which separated was purified by precipitating from an acetone solution with water. The nitro body was reduced in methyl alcohol by hydrogenation at 100° C. using a reduced nickel catalyst. When the reduction was complete, the hot mixture was filtered to remove the catalyst. Most of the alcohol was then removed by distillation and the free base obtained by adding water and allowing the mixture to cool.

Cotton skeins, impregnated in the usual manner with the ortho-toluidide of 2,3-hydroxy-naphthoic acid, were developed in a diazo bath prepared as follows:

30 parts of chlorofuroylamino-2,5-dimethoxy-aniline were stirred with 30 parts of hydrochloric acid of 30% strength and 350 parts of cold water, and the base diazotized by the addition of a slight excess of sodium nitrite solution as shown by a spot test on starch-potassium iodide paper. When the diazotization was complete, the solution was filtered and the mineral acidity neutralized with sodium carbonate.

When the development of the color in the above bath was complete, the skeins were rinsed, soaped at the boil, rinsed and dried. By this process a blue dye of the probable structure:

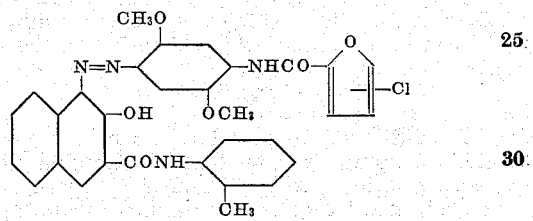

was obtained. The color possessed good fastness to washing and fair fastness to light.

Example 13

Cotton skeins, impregnated in the usual manner with the beta-naphthalide of 2,3-hydroxy-naphthoic acid, were developed in a diazo bath prepared from 24.6 parts of 2-(3'-methyl-thenoylamino)-5-amino-toluene by the method given in Example 1. After the development, and the rinsing and soaping of the skeins, a red dyeing of good fastness to washing and fair fastness to light was obtained. The dye has the probable structure:

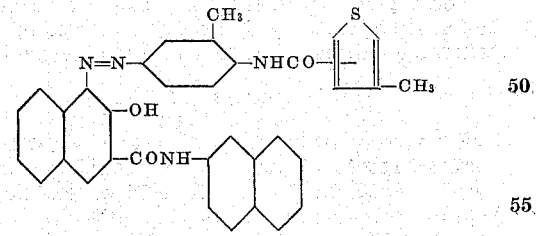

Example 14

Cotton skeins, impregnated in the usual manner with the ortho-toluidide of 2,3-hydroxy-naphthoic acid, were developed in a diazo bath prepared from 29.2 parts of 4-(3'-methyl-thenoylamino)-2,5-dimethoxy-aniline by the method given in Example 1. After the development, and the rinsing and soaping of the skeins, a blue dyeing of good fastness to washing and light was obtained. The dye has the probable structure:

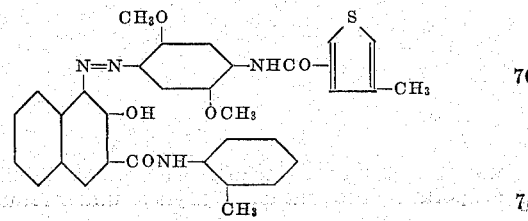

Example 15

A solution of the anilide of 2,3-hydroxy-naphthoic acid was prepared by stirring 10 parts of the anilide with 5 parts of alcohol, adding 25 parts of sodium hydroxide of 25% strength and 500 parts of water. A diazo solution prepared from 4-furoylamino-2,5-diethoxy-aniline was prepared as in Example 6. An equivalent quantity of the diazo solution was added to the solution of the anilide, resulting in coupling to form the insoluble pigment possessing the following constitution:

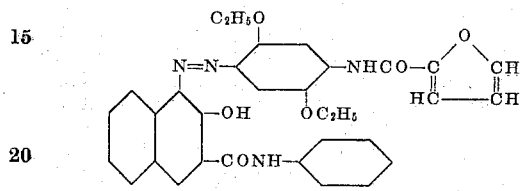

The pigment was filtered, washed and dried. It formed a reddish-blue powder, which dissolved in concentrated sulfuric acid to a greenish-blue solution.

Example 16

A solution of the anilide of 2,3-hydroxy-naphthoic acid was prepared as in Example 15. A diazo solution, prepared from 4-(3'-methyl-thenoylamino)-2,5-dimethoxyaniline as in Example 14, was then added to the solution of the anilide in an equivalent amount. Coupling resulted to form the insoluble pigment of the probable structure:

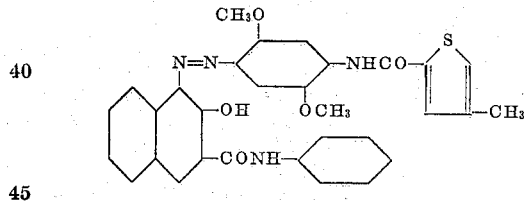

The pigment was filtered, washed and dried. It formed a black powder, which dissolved in concentrated sulfuric acid to a bright blue solution.

Example 17

29.0 parts of 4-furoylamino-2,5-diethoxy-aniline were stirred in 30 parts of hydrochloric acid of 30% strength and 350 parts of cold water, and the base diazotized with 7 parts of sodium nitrite dissolved in 30 parts of water. When the diazotization was complete the solution was filtered. 15 parts of piperidine-alpha-carboxylic acid were dissolved in 50 parts of water containing 10 parts of sodium carbonate solution. The diazo solution was added to the piperidine-alpha-carboxylic acid solution, followed by sufficient sodium carbonate solution to render the mass alkaline to brilliant yellow papers. A diazoimino compound of the probable-constitution:

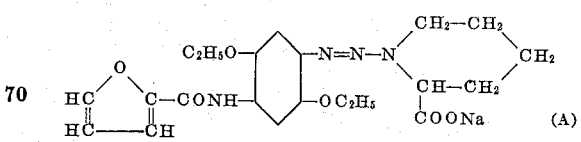

was thus produced. The product was isolated by evaporating the solution to dryness under reduced pressure. It was purified to remove inorganic salts by extraction with alcohol, filtration, and removal of the alcohol by evaporation to dryness.

A printing paste was prepared according to the following formula:

5 parts of a dry mixture containing—8.5 parts of the diazoimino compound of Formula (A), 5.3 parts of the o-toluidide of 2,3-hydroxy-naphthoic acid.
5 parts ethylene-glycol-monoethyl-ether.
3 parts sodium hydroxide solution of 30% strength.
65 parts starch tragacanth thickener.
22 parts water.
—
100

Cotton piece goods were printed from an engraved copper roll with the above paste. The printed fabric was then subjected to the action of saturated steam containing the vapors of acetic acid, at a temperature of about 212° F. Rapid development of the pattern to a bright blue dyeing resulted, due to the formation on the fiber of the dye of the formula given in Example 6. The fabric was rinsed, soaped, rinsed and dried. The printed pattern showed good fastness to light and washing.

It is apparent that numerous components may be selected in producing the azo dyes and pigments comprised herein. For instance, the heterocyclic residue may be derived from other classes than the furane and thiophene series, although these are preferred for optimum results. Heterocyclic series which are adapted hereto are those such as the oxazole, thiazole, pyrazole, imidazole, pyrrole, pyrane, pyridine, piperidine, pyrimidine, benzothiazole, quinoline, and acridine series. The aforementioned heterocyclic series are not intended to be mutually exclusive but are given merely as illustrations of the wide range of heterocyclic compounds which may be utilized herein. These compounds may have one or more groups substituted thereon. Typical radicals which may be used with good results are alkyl, alkoxyl, aralkyl, aryl, aryloxyl, nitro, and halogen groups. It is desirable that no water-solubilizing groups, such as the sulfonic or carboxylic acid groups, be present although with the exception of the aforementioned solubilizing non-solubilizing groups other well known groups, a few of which have just been described, may be used.

The arylene residue is also capable of wide variation. This residue is preferably derived from a members of the benzene or naphthalene series, particularly the former. When this residue is derived from a member of the benzene series the amino groups may be ortho, meta or para to each other. However, the compounds which are suitable for use in this connection are not confined to members of the aforementioned series since members of numerous polynuclear isocyclic series may also be used with satisfactory results. Examples of a few of such polynuclear isocyclic series are derivatives of the anthracene, phenanthrene and fluorene series. Likewise, the components selected for this purpose may have one or more non-water-solubilizing groups substituted thereon. A few of the well known substituents falling within this category are alkyl, alkoxyl, aryloxyl and halogen groups. As in the case of the heterocyclic component, solubilizing groups such as the carboxylic and sulfonic acid groups should not be present thereon.

Ice color coupling components are well known in the art. However, for purposes of illustration representative compounds selected from among such components will now be given. They are:

(1) The arylamides of various hydroxy-aryl-carboxylic acids such as
   2-Hydroxy-naphthalene-3-carboxylic acid
   2-Hydroxy-carbazole-3-carboxylic acid
   2-Hydroxy-anthracene-3-carboxylic acid
   Alkylamino- and arylamino - 2 - hydroxy - naphthalene-3-carboxylic acid
   3-Hydroxy-diphenylamine-4-carboxylic acid
   7-Hydroxy-α-naphthocarbazole-6- carboxylic acid The arylamines used in producing such arylamides may be aniline, the toluidines, alkoxy- and aryloxyanilines, halogenated anilines, halogenated toluidines, halogenated alkoxy- and aryloxyanilines, dianisidine, α- and β-naphthylamine, etc.

(2) Various acylamino-naphthols, such as
   1-Benzoylamino-7-naphthol
   2-Toluoylamino-3-naphthol
   1-(2'-chlorobenzoylamino)-5-naphthol (3) Alpha- and beta-naphthol (4) Acyl-acetyl derivatives of arylamines and arylene-diamines such as
   Acetoacetanilide
   Benzoylacetanilide
   Di-acetoacetyl-tolidine (5) Aryl-methyl-pyrazolones, such as
   1-Phenyl-3-methyl-5-pyrazolone (6) Dihydroxy-quinolines The compounds comprised herein may be produced in the form of pigments by coupling in aqueous solution or suspension. When textile material is to be dyed therewith several well known methods may be utilized as follows:

(1) Textile material may be padded with the ice color coupling components and then immersed in diazo solutions prepared from the arylamines described herein.
(2) The fibers may be padded with coupling components and printed with pastes containing diazo salts prepared from the desired arylamines.

(3) The arylamines may be diazotized and converted to soluble derivatives which are stable and non-reactive toward the ice color coupling components under alkaline conditions. Printing compositions are then prepared from these diazo derivatives and ice color coupling components according to the customary methods wherein alkalies, assistants, etc., are added thereto. The fibers are then printed with these pastes and the color developed thereon by treatment with mild acidic reagents under proper conditions of temperature. This method of imparting color to textile material is illustrated in Example 17. Additional amines which may be substituted for the piperidine-alpha-carboxylic acid described therein, with the probable formula of the resulting diazo-imino compound, are as follows:

CH₃NHCH₂—COOH
Sarcosin

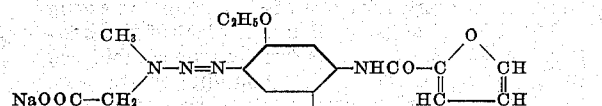

CH₃CH₂NHCH₂CH₂SO₃H
Ethyl-taurine

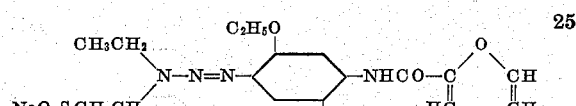

CH₂—CH₂
CH₂ CH—COOH
 N
 H
Proline

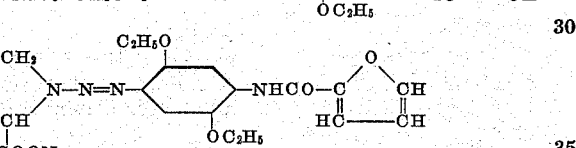

CH₂—OH
(CHOH)₄
CH₂—NHCH₃
Methyl-glucamine

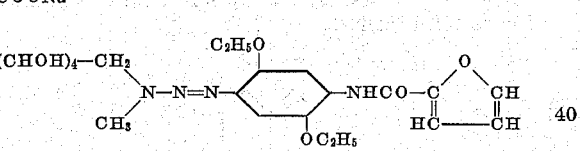

The compounds forming the subject matter of this invention produce upon textile materials attractive colors having excellent fastness to light, washing, kier-boiling and chlorine. The wide range of components which may be utilized according to the instructions heretofore given permit a variety of desirable colors to be produced. By a proper selection of diazo salt and coupling component yellows, scarlets, reds, Bordeaux, violets, blues, greens, browns, and blacks may be obtained. Likewise, pigments which are insoluble in water and which have valuable characteristics may be produced. Due to the constantly increasing demand for ice colors these compounds form a welcome addition to the compounds heretofore known and used.

As many apparently widely different embodiments of this invention may be made without departing from the spirit and scope thereof, it is to be understood that the invention is not limited to the specific embodiments thereof except as defined in the appended claims.

I claim:
1. A compound represented by the formula

B—CONH—Aryl—N=N—A in which B is one of the group consisting of the nuclear radicals of furane and thiophene compounds which are free from water solubilizing groups, aryl is one of the group consisting of radicals of the benzene and naphthalene series which are free from water solubilizing groups and A is the radical of an ice color coupling component.

2. A compound represented by the formula $$\text{H-C=CH} \atop \text{H-C} \diagdown_X\diagup \text{C-CONH-R-N=N-A}$$

in which X represents one of the group consisting of oxygen and sulphur, R is one of the group consisting of radicals of the benzene and naphthalene series which are free from water solubilizing groups and A is the radical of an arylamide of 2:3-hydroxy-naphthoic acid.

3. The water insoluble azo dyes having the general formula $$\text{H-C=CH} \atop \text{H-C} \diagdown_X\diagup \text{C-CONH-R-N=N-A}$$

in which X stands for one of the group consisting of oxygen and sulphur, R is a radical of the benzene series which is free from water solubilizing groups and A is an ice color coupling component.

4. A compound represented by the formula $$\text{H-C=CH} \atop \text{H-C} \diagdown_X\diagup \text{C-CONH-R-N=N-}\bigcirc\!\!\bigcirc \text{(OH, CONH-Aryl)}$$

in which X is one of the group consisting of oxygen and sulphur, and R is a radical of the benzene series which is free from water solubilizing groups.

5. Water insoluble azo dyes having the following general formula $$\text{Z-CONH=R-N=N-}\bigcirc\!\!\bigcirc\text{(-OH, -CONH-Aryl)}$$

wherein Z represents the radical of a furane compound which is free from water solubilizing groups and R is a radical of the benzene series which is free from water solubilizing groups.

6. Water insoluble azo dyes having the following general formula $$\text{Z-CONH-R-N=N-}\bigcirc\!\!\bigcirc\text{(-OH, -CONH-Aryl)}$$

wherein Z represents the radical of a thiophene compound which is free from water solubilizing groups and R is a radical of the benzene series which is free from water solubilizing groups.

7. A compound represented by the formula $$\text{B-CONH-Aryl-N=N-A} \atop \text{Y} \quad\quad \text{X}$$

in which B is one of the group consisting of nuclear radicals of furane and thiophene compounds, aryl is one of the group consisting of the nuclear radicals of benzene and naphthalene compounds, X is one of the group consisting of hydrogen, alkyl, alkoxy, arylkoxy, nitro and halogen, Y is one of the group consisting of hydrogen, alkyl, aryloxy, aralkyl, aryl, nitro and halogen, and A is the radical of an arylamide of 2:3-hydroxy-naphthoic acid.

8. A compound represented by the formula $$\text{H-C=CH} \atop \text{H-C} \diagdown_X\diagup \text{C-CONH-R-N=N-A} \atop \text{Y}$$

in which X represents one of the group consisting of oxygen and sulphur, R is one of the group consisting of a benzene radical and a naphthalene radical, Y is one of the group consisting of hydrogen, alkyl, aryloxy, nitro and halogen, and A is the residue after coupling of an ice color coupling component.

9. Water insoluble azo dyes represented by the formula $$\text{Z-CONH-Aryl} \diagdown \text{L} \atop \text{N=N-A}$$

in which Z represents the radical of a furane compound which is free from water solubilizing groups, aryl represents the nuclear radical of an aniline, L is one of a group consisting of hydrogen, alkyl, alkoxy, aryloxy, nitro and halogen, and A represents the radical of an arylamide of 2:3-hydroxy-naphthoic acid.

10. The process for producing water insoluble azo dyes which comprises diazotizing an aromatic amine which is free from water solubilizing groups and is represented by the formula $$\text{Z-CONH-Aryl-NH}_2$$

in which Z is the radical of one of the group consisting of furane and thiophene compounds which are free from water solubilizing groups and aryl is the radical of one of the group consisting of benzene and naphthalene compounds which are free from water solubilizing groups, and coupling the diazo salt thus produced with an ice color coupling component which is free from water solubilizing groups.

11. The process for producing water insoluble azo dyes which comprises coupling the diazo form of an amine having the general formula $$\text{H-C=CH} \atop \text{C} \diagdown_X\diagup \text{C-CONH-R-NH}_2$$

in which X is one of the group consisting of oxygen and sulphur and R is the radical of a benzene compound which is free from water solubilizing groups, with an ice color coupling component.

12. The process of producing water insoluble azo dyes which comprises coupling the diazo form of an amine having the general formula $$\text{H-C=CH} \atop \text{H-C} \diagdown_X\diagup \text{C-CONH-R-NH}_2$$

in which X is one of the group consisting of oxygen and sulphur and R is the radical of a benzene compound which is free from sulfonic acid and carboxy groups, with an arylamide of 2:3-hydroxy-naphthoic acid.

13. The process for producing water insoluble azo dyes which comprises diazotizing an aromatic amine having the general formula $$\text{Z-CONH-R-NH}_2$$

in which Z represents the radical of a thiophene compound which is free from water solubilizing groups and R represents the radical of a benzene compound which is free from sulphonic acid and carboxy groups, and coupling it with an arylamide of 2:3-hydroxy-naphthoic acid.

14. The process for producing water insoluble azo dyes which comprises diazotizing an aromatic amine having the general formula

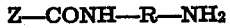

in which Z represents the radical of a furane compound which is free from water solubilizing groups, and R represents a radical of a benzene compound which is free from water solubilizing groups, with an arylamide of 2:3-hydroxy-naphthoic acid.

15. The process of producing water insoluble azo dyes which comprises coupling a diazotized aromatic amine represented by the formula

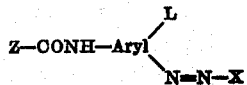

in which Z is the radical of a furane compound which is free from water solubilizing groups, X is one of the group consisting of halogen and the radical of an organic base diazo-salt stabilizer, aryl is the radical of a benzene compound, L is one of the group consisting of hydrogen, alkyl, alkoxy, aryloxy, nitro, and halogen, with an arylamide of 2:3-hydroxy-naphthoic acid.

16. Textile fibres dyed with a dyestuff as defined in claim 1.

17. Textile fibres dyed with a dyestuff as defined in claim 5.

18. Textile fibres dyed with a dyestuff as defined in claim 8.

ROBERT E. ETZELMILLER.

CERTIFICATE OF CORRECTION.

Patent No. 2,144,219. January 17, 1939.

ROBERT E. ETZELMILLER.

It is hereby certified that error appears in the printed specification of the above numbered patent requiring correction as follows: Page 4, second column, lines 53 and 54, for the words "non-solubilizing groups other well known" read groups other well known non-solubilizing; and that the said Letters Patent should be read with this correction therein that the same may conform to the record of the case in the Patent Office.

Signed and sealed this 21st day of March, A. D. 1939.

Henry Van Arsdale.

(Seal) Acting Commissioner of Patents.